(12) United States Patent
Tanno

(10) Patent No.: US 9,654,277 B2
(45) Date of Patent: May 16, 2017

(54) CLOCK GENERATION APPARATUS, SERVER SYSTEM AND CLOCK CONTROL METHOD

(71) Applicant: NEC Corporation, Minato-ku, Tokyo (JP)

(72) Inventor: Yuki Tanno, Tokyo (JP)

(73) Assignee: NEC CORPORATION, Tokyo (JP)

(*) Notice: Subject to any disclaimer, the term of this patent is extended or adjusted under 35 U.S.C. 154(b) by 99 days.

(21) Appl. No.: 14/660,598

(22) Filed: Mar. 17, 2015

(65) Prior Publication Data

US 2015/0270944 A1     Sep. 24, 2015

(30) Foreign Application Priority Data

Mar. 19, 2014   (JP) ................. 2014-055794

(51) Int. Cl.
*H04L 7/00* (2006.01)
*H04J 3/06* (2006.01)
*G06F 1/12* (2006.01)

(52) U.S. Cl.
CPC .............. *H04L 7/0016* (2013.01); *G06F 1/12* (2013.01); *H04J 3/0688* (2013.01); *H04L 7/0083* (2013.01)

(58) Field of Classification Search
CPC . H04L 2027/0036; H04L 7/00; H04L 7/0016; H04L 7/002; H04L 7/008;
(Continued)

(56) References Cited

U.S. PATENT DOCUMENTS 5,059,925 A * 10/1991 Weisbloom ............... H03L 7/08
                                                  331/1 A
5,274,678 A * 12/1993 Ferolito ................. H04L 7/0083
                                                  327/141
(Continued)

FOREIGN PATENT DOCUMENTS

EP    1939708 A2    7/2008
JP    8-335933 A    12/1996
(Continued)

OTHER PUBLICATIONS

Japanese Office Action for JP Application No. 2014-055794 mailed on Jun. 30, 2015 with English Translation.
(Continued)

*Primary Examiner* — Warner Wong

(57) ABSTRACT

In order to provide a multiplexed clock generation apparatus in which synchronization between circuits based on a received clock is not lost, a clock generation apparatus is made to have a clock determination unit which determines whether a cycle shift time between a first clock signal and a second clock signal satisfies a predetermined condition or not and a clock switching unit which switches the first clock signal and the second clock signal based on determination of the clock determination unit. The clock determination unit determines that clock switching is possible when, as the predetermined condition, a first condition that a cycle shift time is equal to or more than a period from a setup start time to a hold end time of a signal specified for a clock bus and a second condition that the cycle shift time exists before the next setup start time are satisfied together.

7 Claims, 11 Drawing Sheets

(58) Field of Classification Search
CPC . H04L 7/0083; H04L 7/0337; H04L 27/2655; H04L 7/0033; H04L 7/0054; H04W 52/0287
See application file for complete search history.

(56) References Cited

U.S. PATENT DOCUMENTS

| | | | | |
|---|---|---|---|---|
| 5,315,181 | A * | 5/1994 | Schowe | G06F 1/08 326/93 |
| 5,373,254 | A * | 12/1994 | Nakauchi | H03L 7/143 331/1 A |
| 5,517,638 | A * | 5/1996 | Szczepanek | H04L 7/0083 327/141 |
| 5,604,452 | A * | 2/1997 | Huang | G06F 1/08 326/46 |
| 5,726,593 | A * | 3/1998 | Ruuskanen | G06F 1/08 327/292 |
| 5,758,136 | A * | 5/1998 | Carlson | G06F 1/08 327/212 |
| 6,189,076 | B1 * | 2/2001 | Fadavi-Ardekani | G06F 13/1605 711/147 |
| 6,275,546 | B1 * | 8/2001 | Miller | G06F 1/08 375/354 |
| 6,310,498 | B1 * | 10/2001 | Larsson | H03L 7/0996 327/141 |
| 6,366,146 | B2 * | 4/2002 | Fredriksson | H03L 7/087 327/145 |
| 6,453,425 | B1 * | 9/2002 | Hede | G06F 1/08 327/99 |
| 6,741,109 | B1 * | 5/2004 | Huang | H03L 7/081 327/148 |
| 6,795,932 | B2 * | 9/2004 | Ohkawa | G06F 1/08 375/271 |
| 6,845,490 | B2 * | 1/2005 | Natsume | H03L 7/0814 327/152 |
| 7,003,683 | B2 * | 2/2006 | Muroor | G06F 1/08 326/93 |
| 7,046,047 | B2 * | 5/2006 | Daijo | H03K 5/1252 327/298 |
| 7,145,368 | B2 * | 12/2006 | Hashimoto | H03K 5/135 327/294 |
| 7,259,598 | B2 * | 8/2007 | Wu | G06F 1/12 327/298 |
| 7,334,152 | B2 * | 2/2008 | Morigaki | G06F 1/08 327/171 |
| 7,405,628 | B2 * | 7/2008 | Hulfachor | H03L 7/087 327/147 |
| 7,605,617 | B2 * | 10/2009 | Lepek | G06F 1/08 327/298 |
| 7,777,534 | B2 * | 8/2010 | Kuan | H03K 5/1506 327/117 |
| 7,821,311 | B2 * | 10/2010 | Kim | H03L 7/07 327/149 |
| 8,140,918 | B2 * | 3/2012 | Kanaya | G06F 1/04 713/500 |
| 9,118,458 | B1 * | 8/2015 | Lintonen | G06F 1/06 |
| 2001/0032323 | A1 * | 10/2001 | Takagi | H04N 1/053 713/500 |
| 2002/0126785 | A1 * | 9/2002 | Maggio | H04L 7/0337 375/373 |
| 2003/0090302 | A1 * | 5/2003 | Hanamori | G06F 1/08 327/113 |
| 2004/0150426 | A1 | 8/2004 | Zhu et al. | |
| 2007/0230647 | A1 * | 10/2007 | Pourbigharaz | H04L 7/0083 375/371 |
| 2008/0146180 | A1 | 6/2008 | Yoda et al. | |
| 2012/0027144 | A1 * | 2/2012 | Chiang | H04L 7/0337 375/354 |
| 2016/0112223 | A1 * | 4/2016 | Kitsukawa | H04L 25/4904 375/346 |

FOREIGN PATENT DOCUMENTS

| | | |
|---|---|---|
| JP | H08335933 A | 12/1996 |
| JP | 11-145941 A | 5/1999 |
| JP | H11145941 A | 5/1999 |
| JP | 2002-006980 A | 1/2002 |
| JP | 2002006980 A | 1/2002 |
| JP | 2006277693 A | 10/2006 |
| JP | 2008-153910 A | 7/2008 |
| JP | 2008153910 A | 7/2008 |
| JP | 2010130638 A | 6/2010 |
| JP | 2013-201743 A | 10/2013 |

OTHER PUBLICATIONS

Japanese Office Action for JP Application No. 2014-055794 mailed on Apr. 14, 2015 with English Translation.

* cited by examiner

CLOCK GENERATION APPARATUS, SERVER SYSTEM AND CLOCK CONTROL METHOD

This application is based upon and claims the benefit of priority from Japanese Patent Application No. 2014-055794, filed on Mar. 19, 2014, the disclosure of which is incorporated herein in its entirety by reference.

TECHNICAL FIELD

The present invention relates to a clock generation apparatus including multiplexed clock transmission circuits, a server system and a clock control method.

BACKGROUND ART

There is a method to perform synchronous control between circuits by: a certain circuit transmitting a synchronization clock; and the other circuits operating based on the synchronization clock. Also, there is a method to improve reliability in preparation for a failure and the like of an active system circuit by: multiplexing circuits for transmitting a synchronization clock; making one circuit among those multiplexed circuits activate a clock transmission function as an active system; and making the remaining circuits be stand-by systems. In such multiplexed circuit configuration, when an active system circuit has a failure or when a preventive maintenance replacement is carried out to the active system circuit, the function of the active system circuit is made to be stopped, and one of stand-by system circuits is made to function as an active system circuit newly.

In a structure in which clock transmission circuits are multiplexed, it is necessary not to lost synchronization between subordinate circuits even if a circuit to transmit a clock is switched.

In patent document 1 (Japanese Patent Application Laid-Open No. 2013-201743), there is disclosed a clock switching device which can prevent synchronization between circuits from being lost in association with switching of a clock transmission circuit. In a clock switching device in patent document 1, synchronization between circuits is achieved by adjusting the phase of a stand-by system clock to the phase of the active system clock in advance so that a transmission clock after switching a clock transmission circuit can be the same phase with the clock before the switching.

Generally, when a synchronizing operation is performed between a plurality of reception circuits based on a synchronization clock outputted from a multiplexed clock transmission circuit, there is a problem that a difference in received clocks occurs between the reception circuits. It is because a path difference to the clock transmission circuit exists between each reception circuit.

For example, when switching is carried out at timing when an active system clock and a stand-by system clock is the same phase mostly and, in addition, at timing of a clock rise, there is a case where a short pulse occurs in addition to a usual clock. At that time, there is a case where a reception circuit with a short path length receives clocks increased by one pulse unnecessarily, and a reception circuit with a long path length receives clocks without increase of one pulse because the pulse is dulled. As a result, a difference occurs to received clocks between the reception circuit with the short path length and the reception circuit with the long path length.

In addition, there is an individual difference in frequency characteristics of oscillators included in clock transmission circuits. Therefore, in a multiplex structure in which an active system clock and a stand-by system clock are generated from separate oscillators, even if the clocks are of the same phase at a certain time point, phases may shift a little at a next time point. When clock switching is carried out in a state that phases are shifted a little, there is a case where a short pulse occurs in addition to a usual clock. At that time, according to a path difference from a clock transmission circuit to each subordinate circuit, there exist a circuit which recognizes the short pulse and a circuit which does not recognize it. As a result, at the time of clock switching, there are a circuit which receives usual clocks and a circuit which receives clocks that are more than usual by one pulse unnecessarily, resulting in a synchronizing operation between the circuits based on a received clock not being performed correctly.

According to a clock switching circuit in patent document 1, loss of synchronization between circuits associated with clock switching can be prevented by using an identical clock supply part. However, there is a problem that, even by a clock switching circuit in patent document 1, loss of synchronization between circuits caused by an individual difference of frequency characteristics of an oscillator and a path difference cannot be prevented in a structure to achieve multiplexing using separate clock supply parts.

SUMMARY

The present invention has been made in order to settle the problem mentioned above, and its object is to provide a multiplexed clock generation apparatus in which an unnecessary clock does not occur when switching a clock transmission circuit, and thus synchronization between circuits based on a received clock is not lost.

A clock generation apparatus of the present invention includes: a clock determination unit which determines whether a cycle shift time between a first clock signal and a second clock signal satisfies a predetermined condition or not; and a clock switching unit which switches the first clock signal and the second clock signal based on determination of the clock determination unit.

In a server system of the present invention, a clock generation apparatus having a clock determination unit which determines whether a cycle shift time of a first clock signal and a second clock signal satisfies a predetermined condition or not and a clock switching unit which switches the first clock signal and the second clock signal based on determination of the clock determination unit, and a plurality of reception circuits to operate based on a clock signal outputted by the clock generation apparatus are connected via a transmission line.

In a clock control method of the present invention, whether a cycle shift time between a first clock signal and a second clock signal satisfies a predetermined condition or not is determined; and the first clock signal and the second clock signal are switched based on determination of whether the cycle shift time satisfies the predetermined condition.

According to the present invention, by preventing an unnecessary clock generation when a clock transmission circuit is switched, a multiplexed clock generation apparatus in which synchronization between circuits based on a received clock is not lost can be provided.

BRIEF DESCRIPTION OF THE DRAWINGS

Exemplary features and advantages of the present invention will become apparent from the following detailed description when taken with the accompanying drawings in which.

EXEMPLARY EMBODIMENT

Embodiments for implementing the present invention will be described using a drawing below. In this regard, however, although limitation that is technically desirable to implement the present invention is applied to exemplary embodiments described below, the scope of the invention is not limited to the followings.

Figure 1:
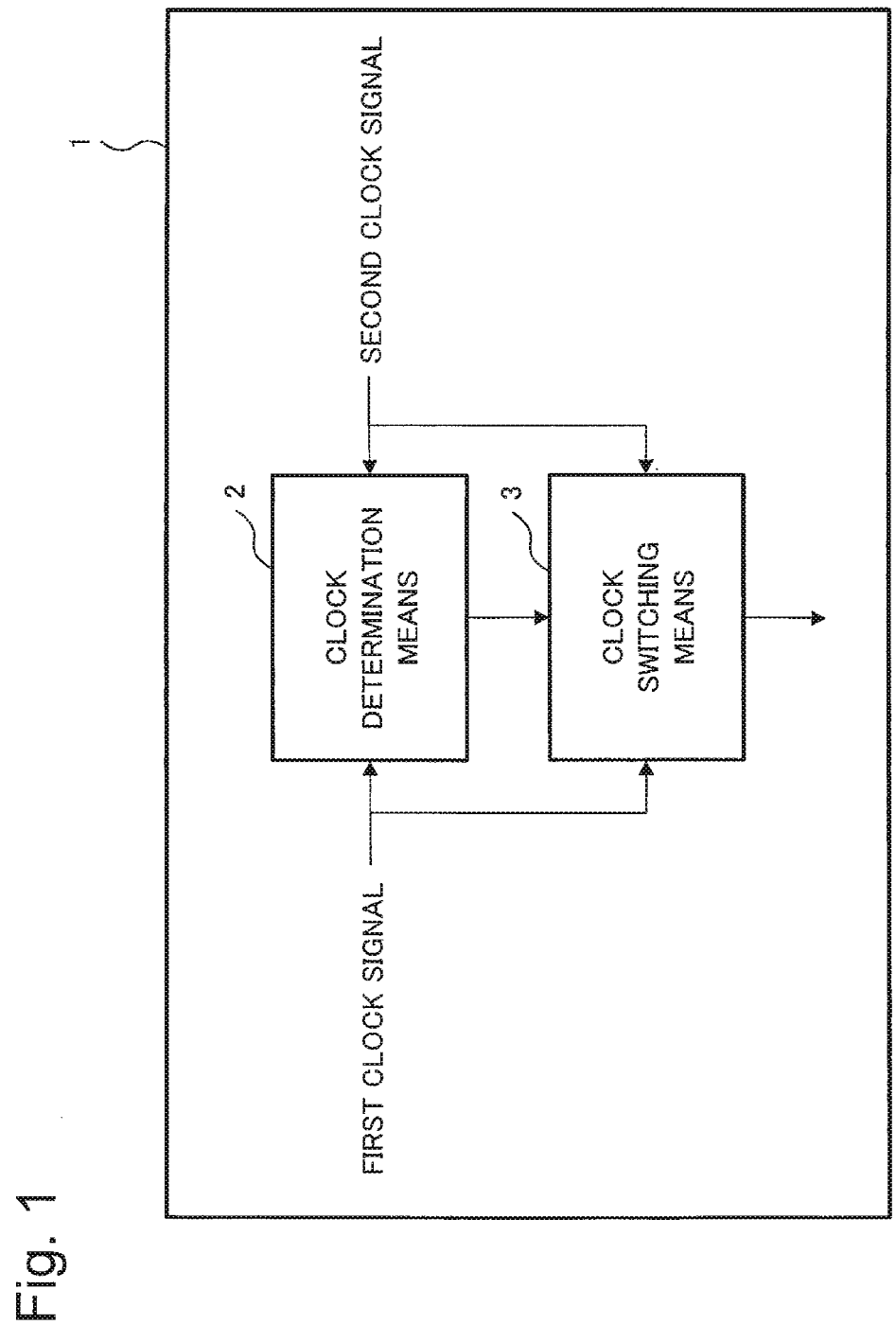
FIG. 1 is a block diagram showing a functional structure of a clock generation apparatus according to a first exemplary embodiment of the present invention.

First, a clock generation apparatus 1 according to the first exemplary embodiment of the present invention will be described using FIG. 1. The clock generation apparatus 1 according to this exemplary embodiment includes a clock determination means 2 and a clock switching means 3.

The clock determination means 2 is means to take a first clock signal and a second clock signal as input, and determine whether a cycle shift time between the first and the second clock signal satisfies a predetermined condition or not. Description will be made later about the predetermined condition.

The clock switching means 3 is means to switch the first clock signal and the second clock signal based on determination of the clock determination means 2.

For example, when the first clock signal is an active system clock signal outputted from the clock generation apparatus 1, the second clock signal corresponds to a stand-by system clock signal that is restrained without being outputted from the clock generation apparatus 1. In contrast, when the second clock signal is an active system clock signal which is outputted from the clock generation apparatus 1, for example, a first clock signal will be a stand-by system clock signal that is restrained without being outputted from the clock generation apparatus 1. In other words, the clock generation apparatus 1 outputs any one of the first clock signal and the second clock signal as an active system clock.

The first clock signal and the second clock signal are generated by different clock transmission circuits (not shown), for example, inside the clock generation apparatus 1. Inside the clock generation apparatus 1, different clock transmission circuits are connected to a common clock bus (not shown). The clock generation apparatus 1 outputs a clock signal generated by one of the clock transmission circuits to external clock receiving apparatus via a clock bus.

Here, the predetermined condition is a condition which satisfies both of the following two conditions.

(1) A condition that comes first (a first condition) is a condition that a cycle shift time obtained from a phase difference between the first clock signal and the second clock signal is equal to or larger than a period from a setup start time to a hold end time of a signal that are specified for the clock bus.

(2) A condition that comes second (a second condition) is a condition that a cycle shift time obtained from a phase difference between the first clock signal and the second clock signal exists before the next setup time.

A cycle shift time obtained from a phase difference between the first clock signal and the second clock signal can be paraphrased into a time from a rise of an active system clock to a rise of a stand-by system clock. Paraphrase can be also made that the clock switching means 3 switches a clock when a cycle shift time is outside the period from a setup start time to a hold end time of a signal specified for a clock bus.

By the clock generation apparatus 1 according to the above exemplary embodiment, it is possible to prevent a clock reception circuit from receiving an unnecessary clock due to influence of a path difference at the time of clock switching. As a result, according to this exemplary embodiment, the multiplexed clock generation apparatus 1 that does not lose synchronization between a plurality of clock reception circuits can be provided.

Next, a clock generation apparatus according to this exemplary embodiment will be described in detail by the following second to fourth exemplary embodiments.

Second Exemplary Embodiment (Structure)

Next, a structure of a clock generation apparatus 10 according to the second exemplary embodiment of the present invention will be described using FIG. 2.

Figure 2:
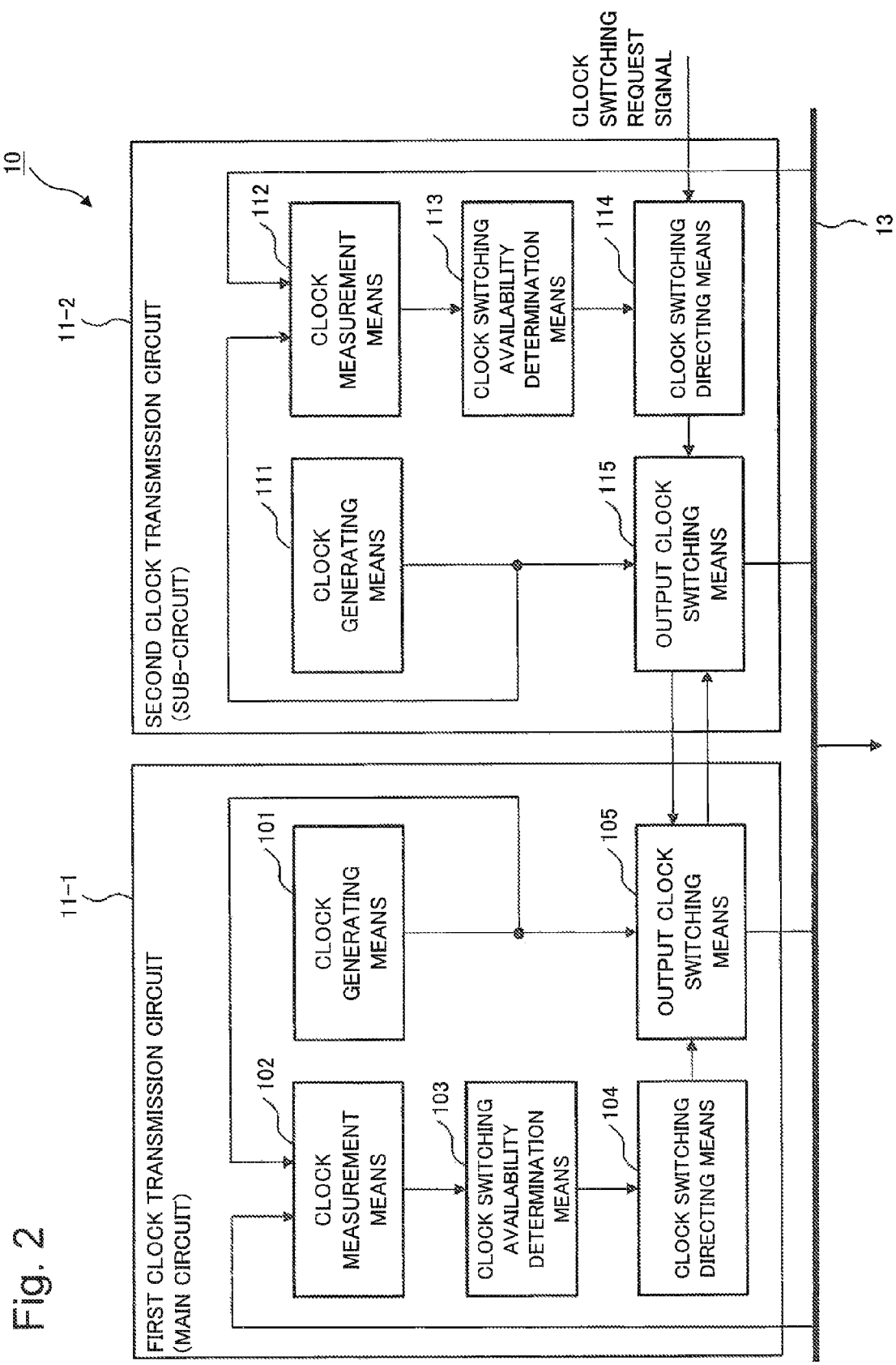
FIG. 2 is a block diagram showing a functional structure of a clock generation apparatus according to a second exemplary embodiment of the present invention.
Figure 3:
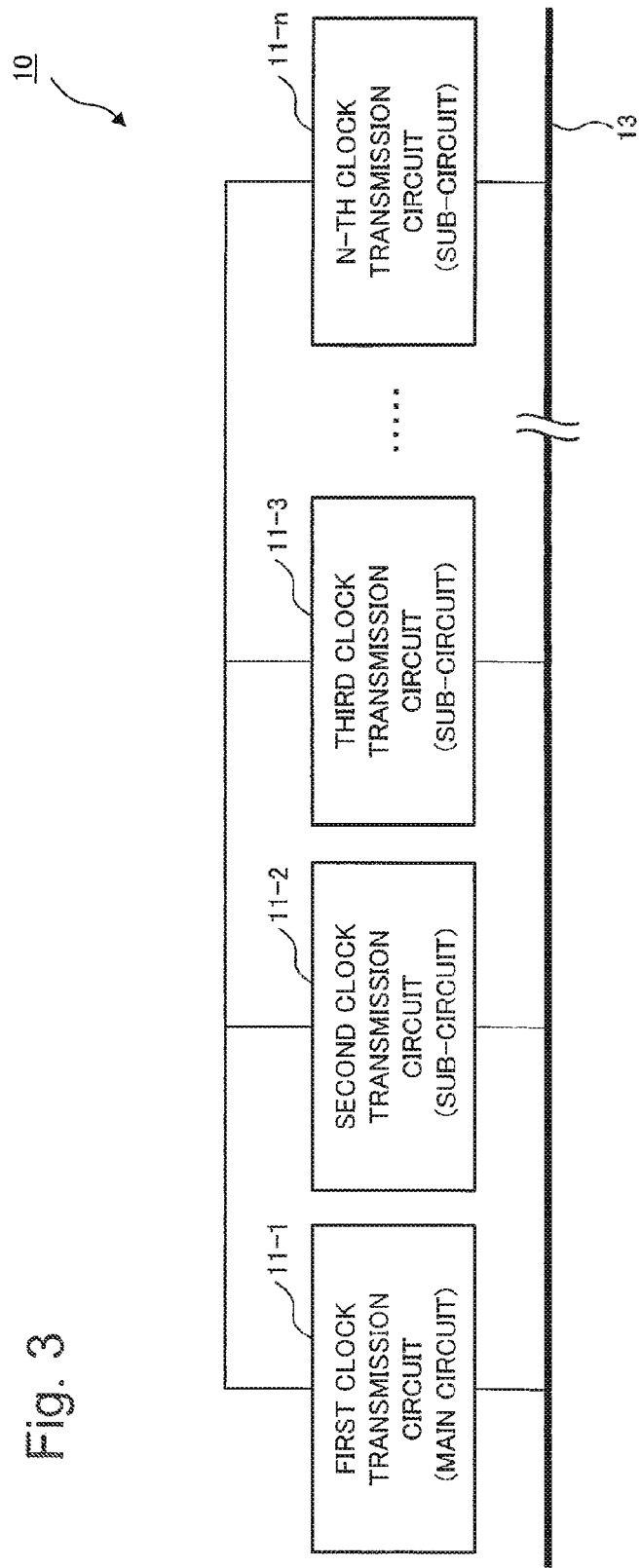
FIG. 3 is a block diagram of an example of a structure in which a clock generation apparatus according to the second exemplary embodiment of the present invention has a plurality of sub-circuits as a main circuit.

Referring to FIG. 2, the clock generation apparatus 10 according to this exemplary embodiment includes a first clock transmission circuit 11-1, a second clock transmission circuit 11-2 and a clock bus 13. Meanwhile, in the following description, it is supposed that, as an initial state, the first clock transmission circuit 11-1 is set as a main circuit and the second clock transmission circuit 11-2 as a sub-circuit. When the second clock transmission circuit 11-2 transits to a main circuit, the first clock transmission circuit 11-1 transits to a sub-circuit. Meanwhile, the clock generation apparatus 10 according to this exemplary embodiment only has to include at least two clock transmission circuits, and it may be formed by first to Nth clock transmission circuits 11-1 to 11-n as shown in FIG. 3 (n and N are a natural number of no smaller than 2).

The first clock transmission circuit 11-1 has a clock generating means 101, a clock measurement means 102, a clock switching availability determination means 103, a clock switching directing means 104 and an output clock switching means 105. When making them correspond to the clock generation apparatus 1 of FIG. 1, the clock determination means 2 is composed of the clock measurement means 102 and the clock switching availability determination means 103, and the clock switching means 3 is composed of the clock switching directing means 104 and the output clock switching means 105.

Similarly, the second clock transmission circuit 11-2 has a clock generating means 111, a clock measurement means 112, a clock switching availability determination means 113, a clock switching directing means 114 and an output clock switching means 115. That is, the first clock transmission circuit 11-1 and the second clock transmission circuit 11-2 have similar circuit configurations. However, the circuit configurations of the first clock transmission circuit 11-1 and the second clock transmission circuit 11-2 are not necessary to be fully identical, and they only have to possess the functions shown in FIG. 2 in common at least.

In the clock generation apparatus 10, a clock generated by the first clock transmission circuit 11-1 that is the main circuit is an active system clock, and a clock generated by the second clock transmission circuit 11-2 that is a sub-circuit is a stand-by system clock. Then, when the second clock transmission circuit 11-2 transits to a main circuit and the first clock transmission circuit 11-1 transits to a sub-circuit, a transmission circuit which generates an active system clock switches over. That is, when the second clock transmission circuit 11-2 transits to a main circuit, a clock generated by the second clock transmission circuit 11-2 becomes an active system clock, and a clock generated by the first clock transmission circuit 11-1 becomes a stand-by system clock.

The first clock transmission circuit 11-1 that is a main circuit in FIG. 2 outputs an active system clock which has been generated by itself to outside via the clock bus 13. In contrast, the second clock transmission circuit 11-2 that is a sub-circuit does not output a stand-by system clock generated by itself to the clock bus 13.

The clock bus 13 is a transmission line for transmitting an active system clock outputted by a main circuit to outside. In FIG. 2, an active system clock which has been generated by the first clock transmission circuit 11-1 that is the main circuit is outputted to the clock bus 13.

As shown in FIG. 3, any number of clock transmission circuits of no smaller than 1 can be connected as a sub-circuit to a clock transmission circuit to be a main circuit.

In FIG. 3, a structure which makes the first clock transmission circuit 11-1 be a main circuit is illustrated. The second clock transmission circuit 11-2, the third clock transmission circuit 11-3, . . . , and the Nth clock transmission circuit 11-n are connected to the first clock transmission circuit 11-1 that is the main circuit as sub-circuits.

For example, when the second clock transmission circuit 11-2 is made to transit to a main circuit, the first clock transmission circuit 11-1 that has been functioning as a main circuit transits to a sub-circuit. Similarly, the third clock transmission circuit 11-3 to the Nth clock transmission circuit 11-n can also transit to a main circuit. Meanwhile, in the clock generation apparatus 10 according to this exemplary embodiment, a main circuit which outputs an active system clock to the clock bus 13 is one among the plurality of clock transmission circuits.

Next, an internal configuration of the first clock transmission circuit 11-1 and the second clock transmission circuit 11-2 of the clock generation apparatus 10 according to this exemplary embodiment will be described.

(Clock Generating Means)

The clock generating means has a function to generate a clock signal to be outputted to a clock bus. As mentioned above, a clock signal generated by a clock transmission circuit which is a main circuit is an active system clock signal, and a clock signal generated by a clock transmission circuit which is a sub-circuit is a stand-by system clock signal.

That is, in FIG. 2, a clock signal generated by the clock generating means 101 of the first clock transmission circuit 11-1 that is a main circuit is an active system clock signal. In contrast, a clock signal generated by the clock generating means 111 of the second clock transmission circuit 11-2 that is a sub-circuit is a stand-by system clock signal. After the main circuit and the sub-circuit have been switched over, a clock signal which the clock generating means 111 generates will be an active system clock signal, and a clock signal which the clock generating means 101 generates will be a stand-by system clock signal.

A clock generating means is realized by an oscillating device including an oscillator which oscillates a specific frequency signal, for example.

The clock generating means 101 of the first clock transmission circuit 11-1 outputs a clock signal generated by itself to the clock measurement means 102 and the output clock switching means 105. Similarly, the clock generating means 111 of the second clock transmission circuit 11-2 outputs a clock signal generated by itself to the clock measurement means 112 and the output clock switching means 115.

(Clock Generating Means)

The clock measurement means of a sub-circuit has a function to receive a clock signal (stand-by system clock signal) generated by its own transmission circuit and an active system clock signal which other clock transmission circuits is transmitting to the clock bus, and measure a phase difference between the stand-by system clock signal and the active system clock signal. Meanwhile, although an operation of the clock measurement means of the main circuit may be suspended, the operation does not have to be suspended necessarily.

That is, in FIG. 2, the clock measurement means 112 of the sub-circuit receives a clock signal generated by its own transmission circuit and an active system clock signal which the first clock transmission circuit 11-1 is transmitting to the clock bus, and measures a phase difference between each signal.

In the initial state of FIG. 2, while the clock measurement means 112 of the second clock transmission circuit 11-2 that has been set as a sub-circuit operates, the clock measurement means 102 of the first clock transmission circuit 11-1 that has been set as a main circuit is suspending its operation. The clock measurement means 102 begins its operations at timing when the first clock transmission circuit 11-1 transits to a sub-circuit, and the clock measurement means 112 suspends its operations at timing when the second clock transmission circuit 11-2 transits to a main circuit. However, as mentioned above, the clock measurement means of a clock transmission circuit that has been set as a main circuit does not have to suspend its operation necessarily.

A clock measurement means can be realized as a structure including: a phase comparator which takes an active system clock signal and a stand-by system clock signal as input; a low pass filter for a phase comparison result output signal; and a voltage measuring instrument to measure a voltage of a filtering result, for example. For example, when making the clock measurement means be of a structure including a phase comparator (phase comparison means), a low pass filter (filtering means) and a voltage measuring instrument (voltage measurement means), a phase difference can be calculated from a measured voltage.

The clock measurement means of a clock transmission circuit being functioning as a sub-circuit outputs a measured phase difference between an active system clock signal and a stand-by system clock signal to a clock switching availability determination means. That is, in FIG. 2, the clock measurement means 112 of the clock transmission circuit functioning as the sub-circuit outputs a measured phase difference between an active system clock signal and its own clock signal to the clock switching availability determination means 113.

(Clock Switching Availability Determination Means)

A clock switching availability determination means has a function to determine whether clock switching is possible or not based on a phase difference measured by the clock measurement means of its own transmission circuit in the state that its own clock cycle shifts by a certain amount relative to the phase of an active system clock signal. Meanwhile, it is supposed that the clock switching availability determination means of a main circuit suspends its operations. However, the clock switching availability determination means of a clock transmission circuit that is being set as a main circuit does not have to suspend its operations necessarily.

That is, in FIG. 2, the clock switching availability determination means 113 that is a sub-circuit determines whether switching of a clock is possible or not in the state that its own clock cycle shifts by a certain amount relative to the phase of an active system clock signal based on a phase difference measured by the clock measurement means 112.

In FIG. 2, the clock switching availability determination means 113 of the sub-circuit determines whether it is possible to switch a clock according to whether a cycle shift time of a stand-by system clock signal obtained from a phase difference satisfies a predetermined condition or not.

Here, the predetermined condition means that the following two conditions are satisfied together.

(1) A first condition is a condition that a cycle shift time of a stand-by system clock signal obtained from a phase difference is equal to or larger than the period from the setup start time to the hold end time of a signal specified for the clock bus 13.

(2) A second condition is a condition that a cycle shift time obtained from a phase difference exists before the next setup time.

Meanwhile, that a cycle shift time of a stand-by system clock signal obtained from a phase difference satisfies the predetermined condition means that clock switching is performed at timing to avoid a setup time and a hold time.

Figure 4:
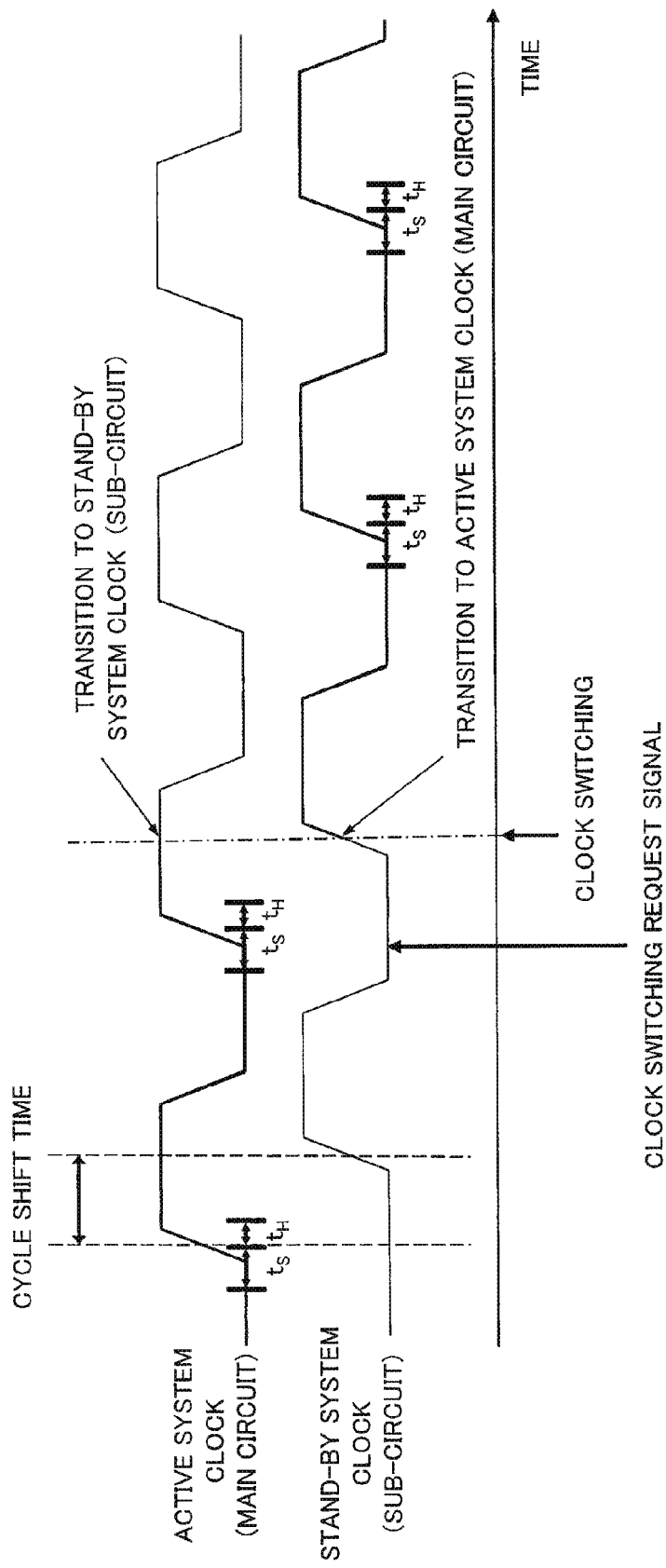
FIG. 4 is a timing chart illustrating a condition whether clock switching can be done or not in a clock generation apparatus according to the second exemplary embodiment of the present invention.

FIG. 4 is an example of a timing chart illustrating the above-mentioned predetermined condition. Meanwhile, a time difference between an active system clock signal and a stand-by system clock signal corresponds to a cycle shift time. It is supposed that setup time $t_S$ and hold time $t_H$ are specified for the clock bus.

In FIG. 4, it is supposed that, in the initial state, the pulse signal in the upper section is an active system clock signal, and the pulse signal in the lower section is a stand-by system clock signal. In the example of FIG. 4, a cycle shift time is larger than any of setup time $t_S$ and hold time $t_H$.

Here, when a clock switching request signal is inputted to the sub-circuit at timing shown in FIG. 4, both of the two predetermined conditions will be satisfied at timing of the rise of the stand-by system clock signal. Meanwhile, a setup time and a hold time that are made to be the criteria in the first condition are specified by the type of a bus, and are specified by what interface a bus is used.

For example, when a bus is used as I2C (Inter-Integrated Circuit) standard mode, a data setup time is specified to be 250 μs, and a data hold time to be 5 μs. Also, when it is a PCI (Peripheral Component Interconnect) bus of 33 MHz, for example, a setup time at the time of data input is specified to be 3 ns, and a hold time to be 0 ns.

In the example of FIG. 4, the above-mentioned predetermined condition is satisfied, and thus a clock will be switched at timing of the clock switching. As shown in FIG. 4, after the switching of a clock, the pulse signal in the lower section will be an active system clock signal and the pulse signal in the upper section will be a stand-by system clock signal. That is, by switching a clock, the previous stand-by system clock becomes a new active system clock, and, after the clock switching, a clock signal comes to be transmitted to the clock bus from the new active system clock. Therefore, by switching a clock, setup time $t_S$ and hold time $t_H$ will be also changed to timing of the new active system clock standard.

The clock switching availability determination means 113 determines that it is possible to switch a clock when a cycle shift time of a stand-by system clock signal obtained from a phase difference satisfies the predetermined condition, and determines that switching of a clock is impossible when the predetermined condition is not satisfied.

In the initial state of FIG. 2, while the clock switching availability determination means 113 of the second clock transmission circuit 11-2 being set as a sub-circuit operates, the clock switching availability determination means 103 of the first clock transmission circuit 11-1 being set as a main circuit suspends its operations. Then, the clock switching availability determination means 103 starts its operations at timing when the first clock transmission circuit 11-1 transits to a sub-circuit, and the clock switching availability determination means 113 stops at timing when the second clock transmission circuit 11-2 transits to a main circuit.

The clock switching availability determination means 103 (113) of a sub-circuit can be realized as a comparison circuit which compares a cycle shift time of a stand-by system clock signal which is obtained from a phase difference measured by a clock measurement means with the predetermined condition, for example. Meanwhile, the clock switching availability determination means 103 (113) may be made to be of a structure including a storage device (such as a memory and a register) which stores a threshold value, for example.

In the clock generation apparatus 10 according to this exemplary embodiment, by satisfying the predetermined condition mentioned above, an active system clock signal and a stand-by system clock signal will not be switched at timing when they are in the same phase or have a small phase difference. That is, in the clock generation apparatus 10 according to this exemplary embodiment, an output clock will be switched under a condition that clock cycles of an active system clock signal and a stand-by system clock signal shift from each other sufficiently.

(Clock Switching Directing Means)

A clock switching directing means has a function to output, according to a clock switching request signal from an upper system, a clock output suspension direction signal to make output of an active system clock signal be stopped, and issue an instruction to output a clock signal generated in its own transmission circuit to a clock bus. Here, a system, software or the like that manages the clock apparatus is assumed to be an upper system which issues a clock switching request signal. It is also possible to make it be of a structure in which a physical selector switch is provided in a clock generation apparatus, and a switching instruction signal is asserted when the selector switch is pressed.

That is, in FIG. 2, when functioning as a sub-circuit, the clock switching directing means 114 outputs a clock switching instruction signal to the output clock switching means 115. Meanwhile, it may be made to be of a structure in which a mechanism that the second clock transmission circuit 11-2 blocks off clock output of the first clock transmission circuit 11-1 compulsorily is provided, and clock output of the first clock transmission circuit 11-1 is blocked off compulsorily by the side of the second clock transmission circuit 11-2.

In the initial state of FIG. 2, while the clock switching directing means 114 of the second clock transmission circuit 11-2 set as a sub-circuit operates, the clock switching directing means 104 of the first clock transmission circuit 11-1 set as a main circuit is suspending its operations. Also, the clock switching directing means 104 starts its operations at timing when the first clock transmission circuit 11-1 transits to a sub-circuit, and the clock switching directing means 114 stops at timing when the second clock transmission circuit 11-2 transits to a main circuit.

Although the clock switching directing means 104 of the first clock transmission circuit 11-1 is not depicted in FIG. 2 in a manner that it can receive a clock switching request signal, it will be able to receive a clock switching request signal when the first clock transmission circuit 11-1 is switched to a sub-circuit.

The clock switching directing means 104 (114) can be realized by a structure including a control function of CPU (Central Processing Unit), for example.

(Output Clock Switching Means)

An output clock switching means has a function to, about an output state of its own clock signal to a clock bus, switch between a clock restraint state and a clock transmission state according to a received clock switching instruction signal. When paraphrased, an output clock switching means has a function to output its own clock signal generated in its own transmission circuit to the clock bus and a function to restrain it.

The output clock switching means of a main circuit outputs its own clock signal generated in its own transmission circuit to the clock bus. In contrast, the output clock switching means of a sub-circuit restrains output of its own clock signal generated in its own transmission circuit.

That is, in FIG. 2, in the initial state, the output clock switching means 105 of the first clock transmission circuit 11-1 outputs its own clock signal to the clock bus 13. In contrast, in FIG. 2, in the initial state, the output clock switching means 115 of the second clock transmission circuit 11-2 restrains its own clock signal.

When a clock switching instruction signal is received from the clock switching directing means 114, the output clock switching means 115 of the second clock transmission circuit 11-2 that has been a sub-circuit in the initial state outputs the own clock signal to the clock bus 13. At that time, the second clock transmission circuit 11-2 that has been the former sub-circuit will transit to a new main circuit.

The output clock switching means of the clock transmission circuit of the new main circuit outputs a clock output suspension direction signal to the clock transmission circuit which has been a main circuit up to now. Then, the output clock switching means of the clock transmission circuit which has been the main circuit up to now restrains its own clock signal from being outputted to the clock bus when a clock output suspension direction signal is received.

Meanwhile, in switching a clock, there may be set up a function to make the output clock switching means of a transmission circuit which functions as a sub-circuit in the initial state stop the output clock switching means of a clock transmission circuit which functions as a main circuit. Also, a step to transmit an active system clock signal to the clock bus from a new main circuit and a step to transmit a clock output suspension direction signal to the former main circuit from the new main circuit may be performed by an optional order.

That is, in FIG. 2, when a clock switching instruction signal is received, the output clock switching means 115 of the second clock transmission circuit 11-2 outputs its own clock signal to the clock bus 13. At the same time, the output clock switching means 115 of the second clock transmission circuit 11-2 outputs a clock output suspension direction signal to the first clock transmission circuit 11-1 that functions as a main circuit. When the clock output suspension direction signal is received, the output clock switching means 105 of the first clock transmission circuit 11-1 that has been functioning as a main circuit restrains its own clock signal from being outputted to the clock bus 13. Meanwhile, it may be of a structure to make the output clock switching means 105 of the first clock transmission circuit 11-1 be stopped by the output clock switching means 115 of the second clock transmission circuit 11-2 directly.

An output clock switching means can be realized as a multiplexer (selection circuit), for example, which takes a received clock switching instruction signal as a selection control signal.

The above is description about a structure of the clock generation apparatus 10 according to this exemplary embodiment.

(Operation)

Next, operations of the clock generation apparatus 10 according to this exemplary embodiment will be described with reference to FIGS. 5-8. Meanwhile, in below, description will be made to a case where the first clock transmission circuit 11-1 is set as a main circuit and the second clock transmission circuit 11-2 is set as a sub-circuit initially as shown in FIG. 2.

(Sub-Circuit)

First, operations of the second clock transmission circuit 11-2 that is a sub-circuit in the initial state will be described using the flow chart of FIG. 5.

Figure 5:
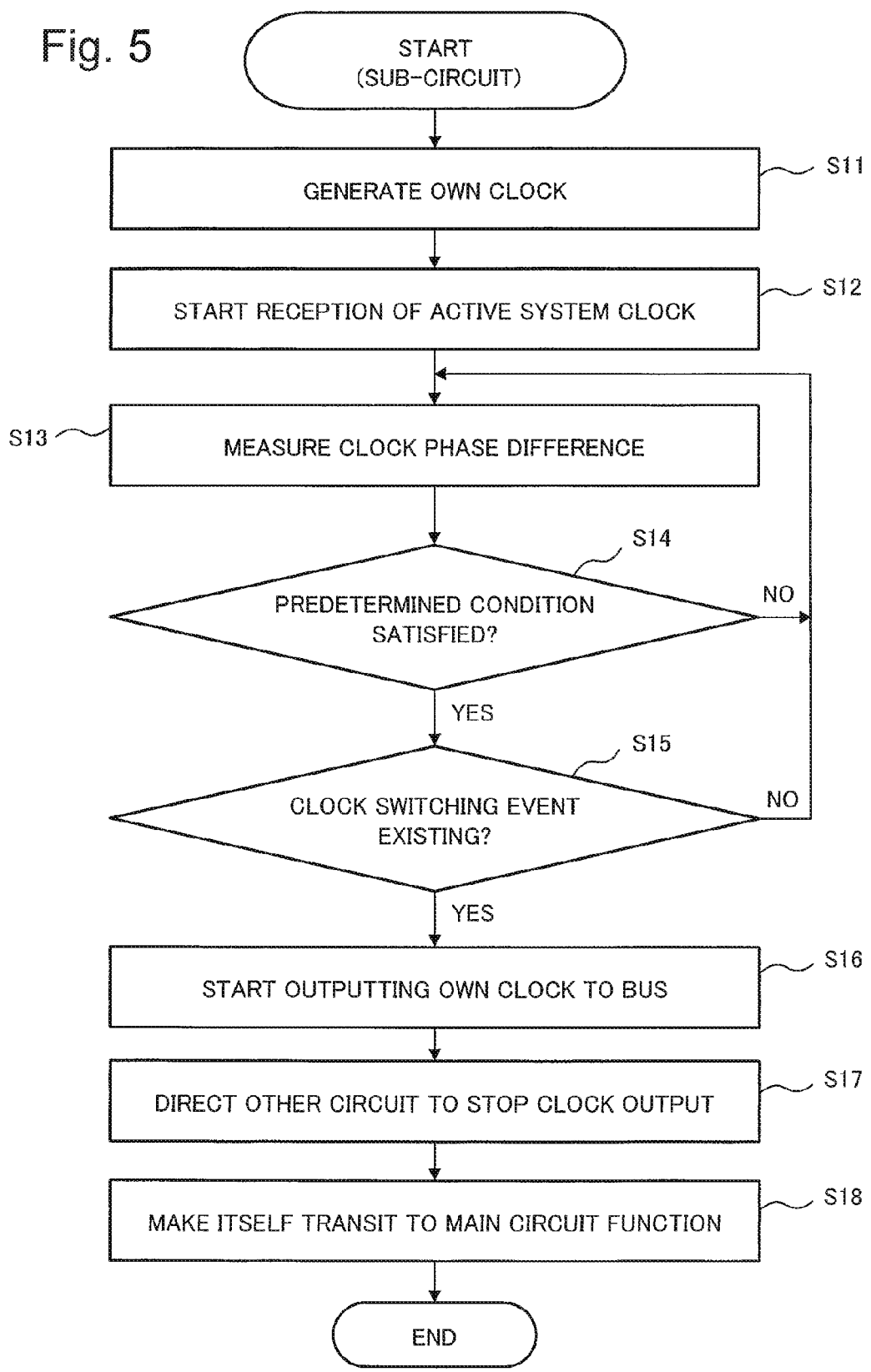
FIG. 5 is a flow chart showing operations of a sub-circuit of a clock generation apparatus according to the second exemplary embodiment of the present invention.

In FIG. 5, the clock generating means 111 of the second clock transmission circuit 11-2 generates a clock signal (stand-by system clock signal) using its oscillator (Step S11). At that time, a clock signal generated in the clock generating means 111 is outputted to the clock measurement means 112 and the output clock switching means 115.

The second clock transmission circuit 11-2 restrains clock transmission in the output clock switching means 115 and receives an active system clock which the first clock transmission circuit 11-1 that is a main circuit transmits to the clock bus 13 (Step S12).

The second clock transmission circuit 11-2 keeps receiving an active system clock signal and measures a phase difference between the active system clock and its own clock in the clock measurement means 112 (Step S13).

Here, based on the predetermined condition, the clock switching availability determination means 113 determines whether it is possible to switch a clock at the present from a calculated phase difference (Step S14).

When a cycle shift time of a stand-by system clock signal obtained from the phase difference satisfies the predetermined condition (in Step S14, Yes), the clock switching availability determination means 113 determines that it is possible to change a clock. When being determined that it is possible to change a clock in Step S14, an advance towards Step S15 of FIG. 5 is made.

On the other hand, when a cycle shift time does not satisfy the predetermined condition (in Step S14, No), the clock switching availability determination means 113 determines that switching of a clock is impossible. When it is determined that switching of a clock is impossible in Step S14, the processing returns to Step S13 of FIG. 5.

Here, according to whether a situation that requires switching of a clock (hereinafter, it is referred to as a clock switching event) is occurring or not, the second clock transmission circuit 11-2 performs different operations (Step S15). Meanwhile, a clock switching event is a situation such as a main circuit replacement in the event of maintenance, a failure or the like of the main circuit, for example.

Even if switching of a clock is possible (in Step S14, Yes), when a clock switching event is not occurring (in Step S15, No), the second clock transmission circuit 11-2 does not switch a clock.

When switching of a clock is possible (in Step S14, Yes) and a clock switching event occurs (in Step S15, Yes), the second clock transmission circuit 11-2 makes the output clock switching means 115 transit from the clock restraint state to the clock transmission state. That is, the second clock transmission circuit 11-2 outputs its own clock signal to the clock bus 13 (Step S16). Then, the second clock transmission circuit 11-2 transmits a clock output suspension direction signal to the first clock transmission circuit 11-1 (Step S17). Meanwhile, although it is arranged in FIG. 5 such that the processing advances towards Step S17 following Step S16, Step S16 and Step S17 may be performed simultaneously, or Step S17 may be performed before Step S16.

After that, the second clock transmission circuit 11-2 transits to a main circuit, and performs operations corresponding to a main circuit (Step S18).

(Main Circuit)

Next, operations of the first clock transmission circuit 11-1 that is a main circuit in the initial state will be described using the flow chart of FIG. 6.

Figure 6:
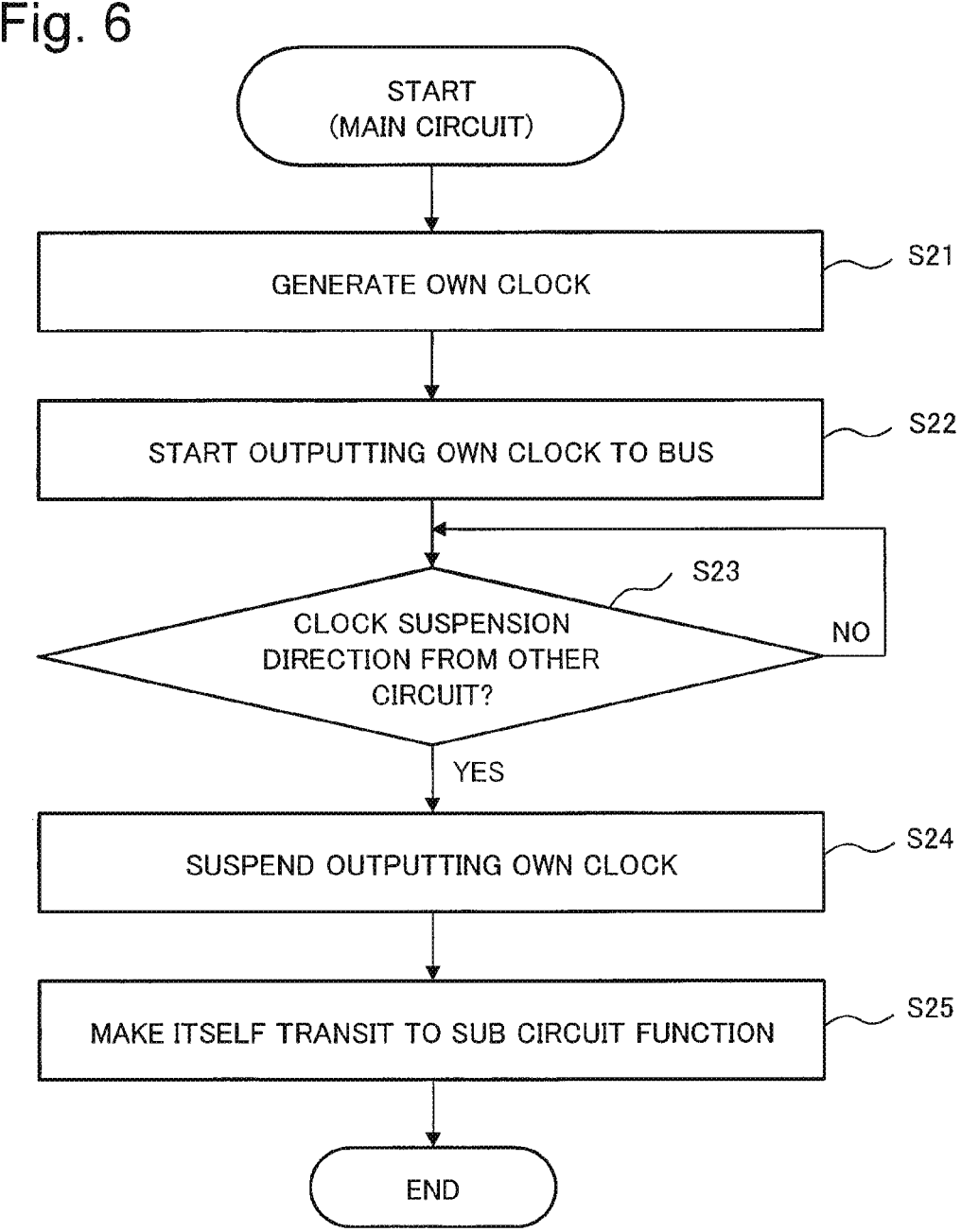
FIG. 6 is a flow chart showing operations of a main circuit of a clock generation apparatus according to the second exemplary embodiment of the present invention.

In FIG. 6, the clock generating means 101 of the first clock transmission circuit 11-1 generates a clock signal to be transmitted to the clock bus 13 (active system clock signal) using its own oscillator (Step S21).

The output clock switching means 105 of the first clock transmission circuit 11-1 transmits its own clock signal to the clock bus 13 (Step S22).

Here, the first clock transmission circuit 11-1 performs different operations according to whether a clock output suspension direction signal has been received from the second clock transmission circuit 11-2 or not (Step S23).

When a clock output suspension direction signal has not been received (in Step S23, No), the first clock transmission circuit 11-1 continues clock output (Step S23 is repeated) until a clock output suspension direction signal is received from the second clock transmission circuit 11-2 that is the other clock transmission circuit.

On the other hand, when a clock output suspension direction signal has been received (in Step S23, Yes), the output clock switching means 105 of the first clock transmission circuit 11-1 stops its clock output (Step S24). Meanwhile, when a mechanism that the second clock transmission circuit 11-2 blocks off clock output of the first clock transmission circuit 11-1 compulsorily is provided, clock output stop processing in Step S24 is carried out by the second clock transmission circuit 11-2.

After that, the first clock transmission circuit 11-1 transits to a sub-circuit and operates as a sub-circuit (Step S25). Meanwhile, when the first clock transmission circuit 11-1 transits to a sub-circuit, it starts or stops at least part of its functions according to the situation, and operates along the flow chart of FIG. 5.

(Operation Relation Between Main Circuit and Sub-Circuit)

Figure 7:
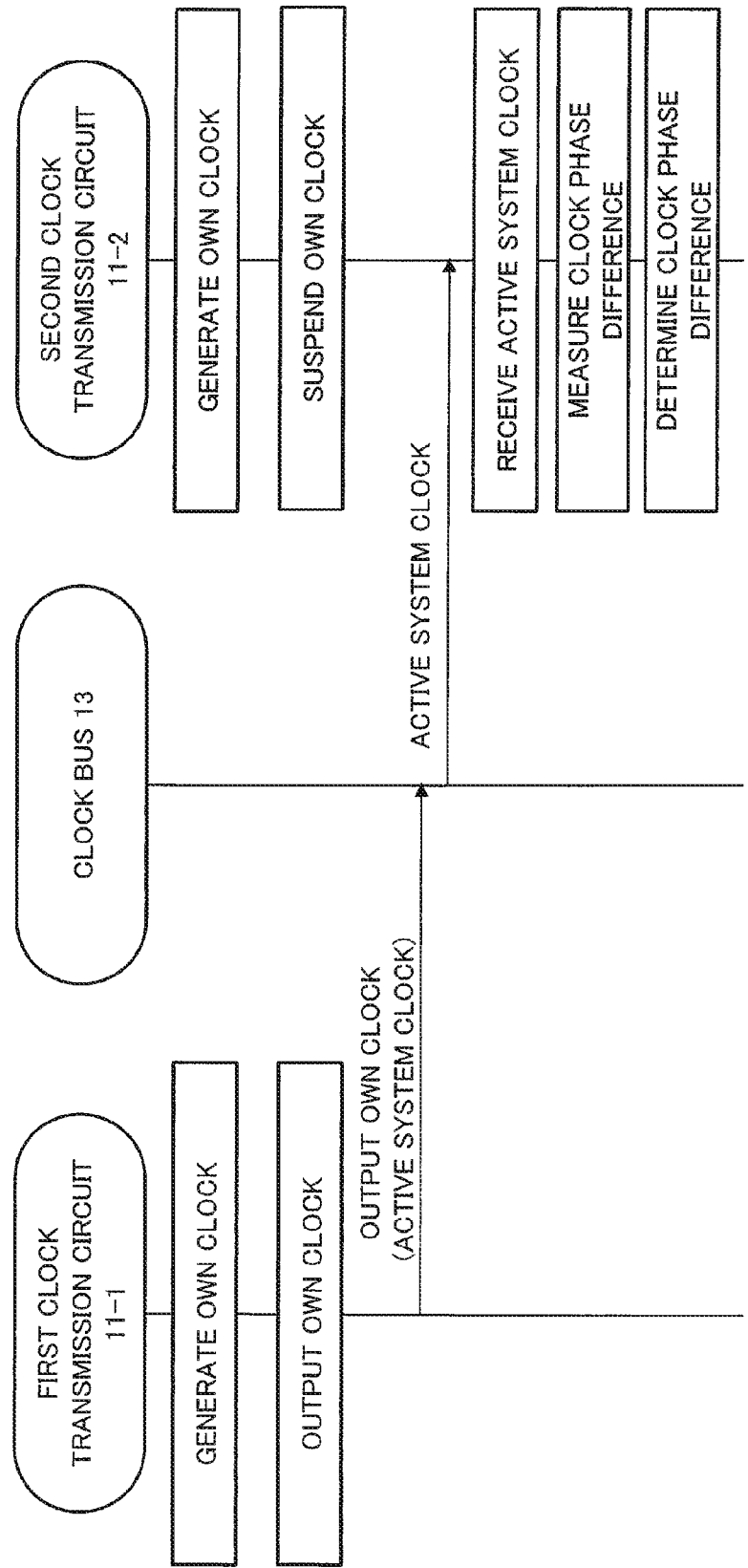
FIG. 7 is a sequence diagram showing relation between operations of a main circuit and those of a sub-circuit in the time of normal operation of a clock generation apparatus according to the second exemplary embodiment of the present invention.
Figure 8:
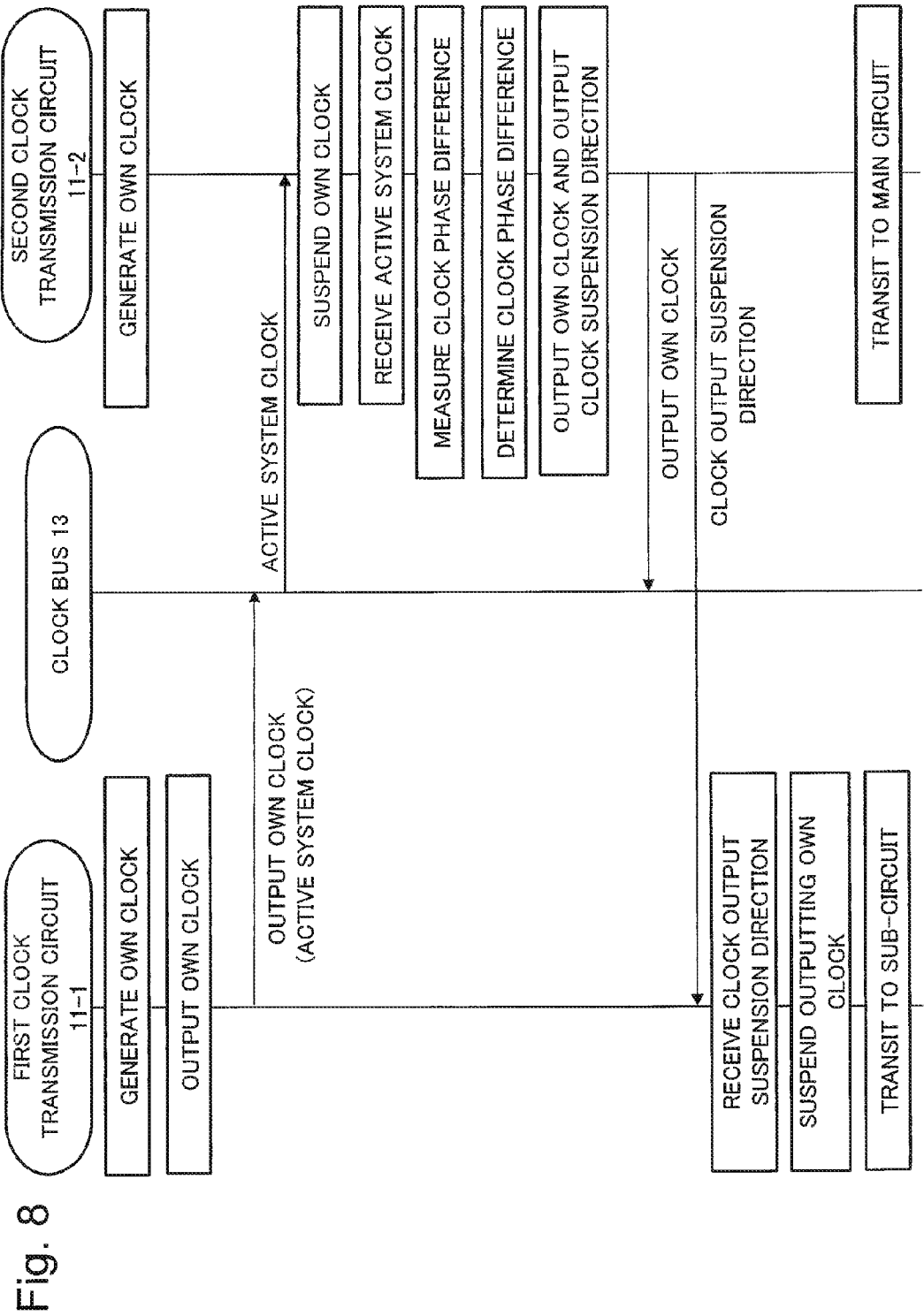
FIG. 8 is a sequence diagram showing relation between operations of a main circuit and a sub-circuit at the time of a switching operation of a clock generation apparatus according to the second exemplary embodiment of the present invention.

In FIG. 7 and FIG. 8, there is shown operation relation between the first clock transmission circuit 11-1 and the second clock transmission circuit 11-2 at the time of normal operations (at the time of initial operations) or at the time of a switching operation. Meanwhile, a main circuit and a sub-circuit operate along the flow charts of FIG. 5 and FIG. 6.

(Normal Operation)

FIG. 7 is a sequence diagram showing operation relation between the first clock transmission circuit 11-1 and the second clock transmission circuit 11-2 in normal operation.

In the first clock transmission circuit 11-1 and the second clock transmission circuit 11-2, clock signals are generated individually. The first clock transmission circuit 11-1 outputs a generated clock signal to the clock bus 13 as an active system clock signal. In contrast, the second clock transmission circuit 11-2 restrains a generated clock signal in the output clock switching means 115. Meanwhile, a clock signal that is restrained in the output clock switching means 115 is called a stand-by system clock signal.

When the active system clock signal is received via the clock bus 13, the second clock transmission circuit 11-2 makes the clock measurement means 112 measure a clock phase difference between the active system clock signal and its own clock signal. Then, the second clock transmission circuit 11-2 determines whether a cycle shift time of a stand-by system clock obtained from a clock phase difference satisfies the predetermined condition or not.

Unless the second clock transmission circuit 11-2 receives a clock switching request signal, operations of the first clock transmission circuit 11-1 and the second clock transmission circuit 11-2 shown in FIG. 7 are repeated.

(Switching Operation)

FIG. 8 is a sequence diagram showing operation relation between the first clock transmission circuit 11-1 and the second clock transmission circuit 11-2 at the time of a switching operation.

In FIG. 8, description will be omitted until the point where the second clock transmission circuit 11-2 determines a difference of a clock phase, because it is similar to the normal operation of FIG. 7.

When a clock switching request signal is received, the second clock transmission circuit 11-2 outputs its own clock signal to the clock bus 13 and outputs a clock output suspension direction signal to the first clock transmission circuit 11-1.

When the first clock transmission circuit 11-1 receives the clock output suspension direction signal from the second clock transmission circuit 11-2, the output clock switching means 105 restrains output of its own clock signal to the clock bus 13.

Thus, by the second clock transmission circuit 11-2 transiting to a main circuit and the first clock transmission circuit 11-1 transiting to a sub-circuit, a transmission circuit of a clock signal is switched over.

As above, in a clock generation apparatus according to this exemplary embodiment, switching of an output clock is not performed at timing when an active system clock signal and a stand-by system clock signal is in the same phase or when a phase difference between them is small, and an output clock is switched under a condition that clock cycles shift sufficiently from each other. As a result, synchronization between circuits based on a received clock is not lost because there are no cases that one unnecessary pulse of a clock signal occurs due to a transmission line difference when a clock signal to be transmitted is switched from an active system clock signal to a stand-by system clock signal.

Meanwhile, in the technique of this exemplary embodiment, although there is a possibility that a timing change of a transmission clock occurs between before and after switching of a clock, a difference does not occur in recognition of a clock between reception circuits.

Third Exemplary Embodiment

Next, a structure of a clock generation apparatus 20 according to the third exemplary embodiment of the present invention will be described using FIG. 9. The clock generation apparatus 20 according to this exemplary embodiment is different from the clock generation apparatus 10 according to the second exemplary embodiment in a point that a first clock transmission circuit 21-1 includes a clock phase changing means 106, and a second clock transmission circuit 21-2 includes a clock phase changing means 116.

Figure 9:
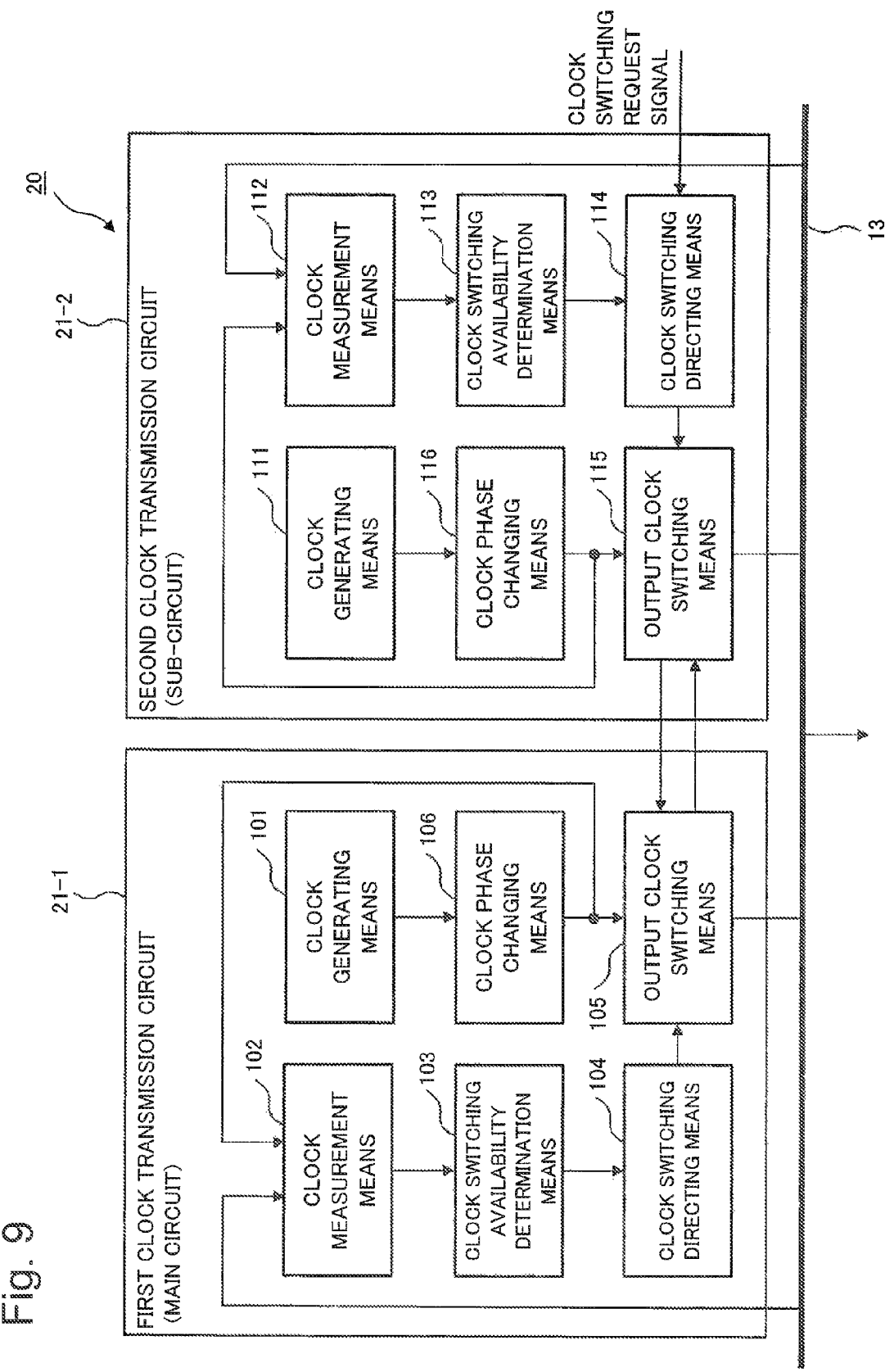
FIG. 9 is a block diagram showing a functional structure of a clock generation apparatus according to a third exemplary embodiment of the present invention.

Referring to FIG. 9, the clock generation apparatus 20 according to this exemplary embodiment includes the first clock transmission circuit 21-1, the second clock transmission circuit 21-2 and the clock bus 13.

The first clock transmission circuit 21-1 has the clock generating means 101, the clock measurement means 102, the clock switching availability determination means 103, the clock switching directing means 104, the output clock switching means 105 and the clock phase changing means 106.

The second clock transmission circuit 21-2 includes the clock generating means 111, the clock measurement means 112, the clock switching availability determination means 113, the clock switching directing means 114, the output clock switching means 115 and the clock phase changing means 116. Meanwhile, any number of clock transmission circuits of no smaller than 1 can be connected as sub-circuits to a clock transmission circuit to be a main circuit as is the case with the second exemplary embodiment.

Next, internal configurations of the first clock transmission circuit 21-1 and the second clock transmission circuit 21-2 of the clock generation apparatus 20 according to this exemplary embodiment will be described. Meanwhile, the first clock transmission circuit 21-1 and the second clock transmission circuit 21-2 according to this exemplary embodiment have the same structure as the second exemplary embodiment except for the clock phase changing means 106 and 116. Therefore, the clock phase changing means 106 and 116 will be described in detail in this exemplary embodiment, and description about the same components as those of the second exemplary embodiment is omitted.

(Clock Phase Changing Means)

A clock phase changing means has a function to change, when a cycle shift time between an active system clock signal and a stand-by system clock signal measured by a clock measurement means does not satisfy the predetermined condition, the phase of its own clock signal and adjust it so as to satisfy the predetermined condition. That is, a clock phase changing means adjusts a cycle shift time between an active system clock signal and a stand-by system clock signal such that it is shifted so as to make it be equal to or more that a period from a setup start time to a hold end time of a signal specified for the clock bus.

In the initial state of FIG. 9, while the clock phase changing means 116 of the second clock transmission circuit 21-2 set as a sub-circuit function, the clock phase changing means 106 of the first clock transmission circuit 21-1 set as a main circuit does not function. In the clock transmission circuit in the side set as a main circuit, a path between the clock generating means and the output clock switching means may be bypassed.

The clock phase changing means 106 start its function at timing when the first clock transmission circuit 11-1 transits to a sub-circuit, and the clock phase changing means 116 stops its function at timing when the second clock transmission circuit 11-2 transits to a main circuit. Meanwhile, the clock phase changing means 106 and 116 do not have to be stopped every time a clock is switched.

The clock phase changing means 116 can be realized by a phase shift circuit (phase shifter) which can adjust a generated clock to an optional phase, for example.

(Operations)

Next, with reference to the flow chart of FIG. 6 and FIG. 10, operations of the clock generation apparatus 20 according to this exemplary embodiment will be described. Meanwhile, in below, description will be made about a case where the first clock transmission circuit 21-1 is set as a main circuit and the second clock transmission circuit 21-2 is set as a sub-circuit initially. Description about operations of the first clock transmission circuit 21-1 (main circuit) according to this exemplary embodiment will be omitted because those are the same as the operations of the first clock transmission circuit 11-1 (main circuit) according to the second exemplary embodiment shown in FIG. 6.

(Sub-Circuit)

Operations of the second clock transmission circuit 21-2 that is a sub-circuit in the initial state will be described using the flow chart of FIG. 10. Meanwhile, description about operations of the first clock transmission circuit 21-1 that is a main circuit in the initial state will be omitted because they are similar to those of the flow chart of FIG. 6.

Figure 10:
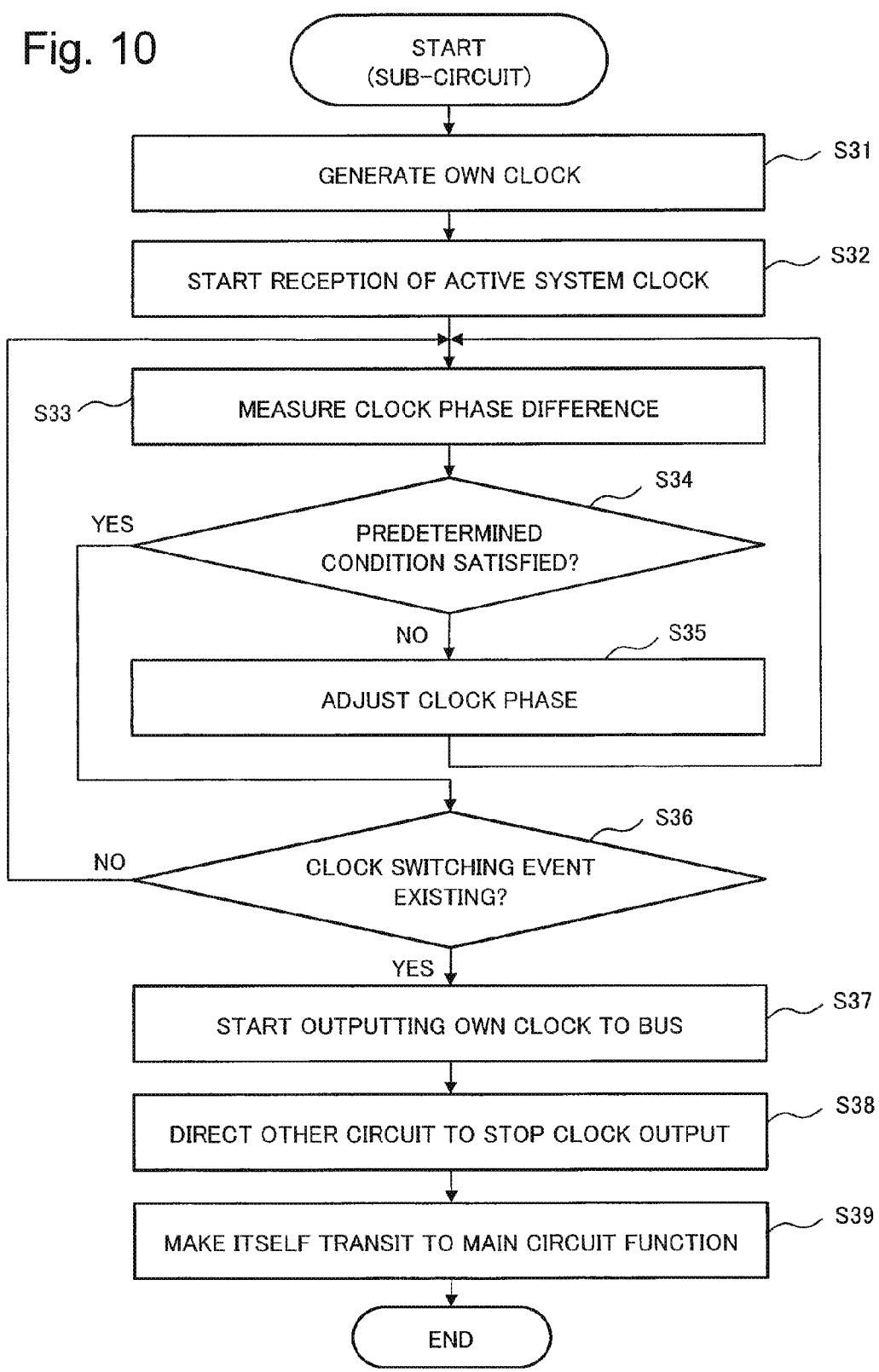
FIG. 10 is a flow chart showing operations of a sub-circuit of a clock generation apparatus according to the third exemplary embodiment of the present invention.

In FIG. 10, the clock generating means 111 of the second clock transmission circuit 21-2 generates a clock signal (stand-by system clock signal) using its oscillator (Step S31).

The second clock transmission circuit 21-2 restrains clock transmission in the output clock switching means 115, and receives an active system clock signal transmitted to the clock bus 13 by the first clock transmission circuit 21-1 that is a main circuit (Step S32).

The second clock transmission circuit 21-2 keeps receiving an active system clock signal and measures a phase difference between an active system clock signal and its clock signal in the clock measurement means 112 (Step S33).

Here, based on the predetermined condition, the clock switching availability determination means 113 of the second clock transmission circuit 21-2 determines whether it is possible to switch a clock or not at the present from a calculated phase difference (Step S34).

When a cycle shift time of a stand-by system clock signal obtained from a phase difference satisfies the predetermined condition (in Step S34, Yes), the clock switching availability determination means 113 determines that switching of a clock is possible. When being determined that switching of a clock is possible in Step S34, the processing advances towards Step S36 of FIG. 10.

On the other hand, when a cycle shift time of a stand-by system clock signal obtained from a phase difference does not satisfy the predetermined condition (in Step S34, No), the clock switching availability determination means 113 determines that switching of a clock is impossible. In this case, the clock phase changing means 116 adjusts the phase of the stand-by system clock signal generated by its own clock transmission circuit so that a cycle shift time may satisfy the predetermined condition (Step S35).

Here, according to whether a situation for which switching of a clock is required (hereinafter, referred to as a clock switching event) is occurring or not, the second clock transmission circuit 21-2 performs different operations (Step S36).

Even if switching of a clock is possible (in Step S34, Yes), the second clock transmission circuit 21-2 does not switch a clock (return to Step S33 is made) when a clock switching event is not occurring (in Step S36, No).

When it is possible to switch a clock (in Step S34, Yes) and a clock switching event occurs (in Step S36, Yes), the second clock transmission circuit 21-2 makes the output clock switching means 115 transit from a clock restraint state to a clock transmission state. That is, the second clock transmission circuit 21-2 outputs its own clock signal to the clock bus 13 (Step S37). Then, the second clock transmission circuit 21-2 transmits a clock output suspension direction signal to the first clock transmission circuit 21-1 (Step S38). Meanwhile, a mechanism that the second clock transmission circuit 21-2 blocks off clock output of the first clock transmission circuit 21-1 compulsorily may be provided. In FIG. 10, although it is arranged such that advance towards Step S38 is made following Step S37, Step S37 and Step S38 may be performed simultaneously, or Step S38 may be performed before Step S37.

After that, the second clock transmission circuit 21-2 performs operations corresponding to a main circuit (Step S39).

Also in a clock generation apparatus according to this exemplary embodiment, a main circuit and a sub-circuit operate in the relation as shown in FIG. 7 and FIG. 8 as is the case with a clock generation apparatus according to the second exemplary embodiment.

As above, according to a clock generation apparatus according to this exemplary embodiment, it becomes possible to, by having a clock phase changing means, set a clock cycle shift time between a main circuit and a sub-circuit so that the predetermined condition may be always satisfied.

In a clock generation apparatus according to the second exemplary embodiment, even in a case where a clock signal is needed to be switched immediately, such as a case of a main circuit failure, for example, there is a possibility that this situation cannot be handled regardless of having received a clock switching request signal because the predetermined condition is not satisfied. In contrast, in a clock generation apparatus according to this exemplary embodiment, even in a case where a clock signal is needed to be switched immediately, such as a case of a main circuit failure, a clock can be switched certainly if it is in the state that a clock signal is already adjusted in advance.

Fourth Exemplary Embodiment

Figure 11:
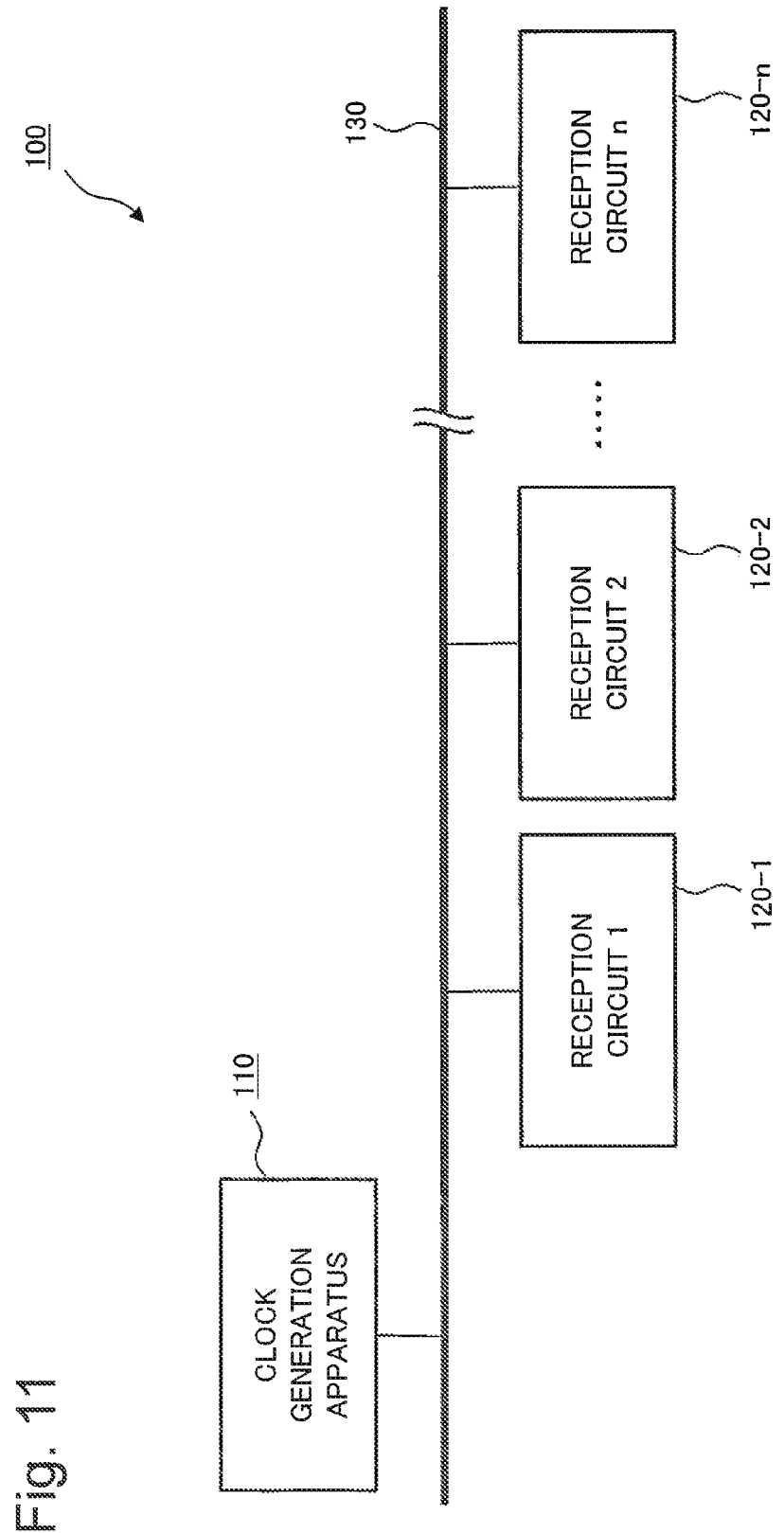
FIG. 11 is a conceptual diagram illustrating a path difference to a clock generation apparatus between reception circuits in a server system according to a fourth exemplary embodiment of the present invention.

FIG. 11 indicates a schematic diagram of a server system 100 according to the fourth exemplary embodiment of the present invention. Meanwhile, although various functional structures are needed in an actual server system, only portions which are the essence of this exemplary embodiment are picked out and shown in a simplified manner in FIG. 11.

The server system 100 according to this exemplary embodiment includes a clock generation apparatus 110 according to the second exemplary embodiment of the present invention, a transmission line 130 and a plurality of reception circuits 120 (120-1, 120-1, . . . , 120-n) (n is a natural number). Meanwhile, although detailed description will be omitted, the clock generation apparatus 110 has the same internal configuration as the clock generation apparatus 10 according to the second exemplary embodiment. In the server system 100, a device having the functional structure of the clock generation apparatus 20 according to the third exemplary embodiment may be used as the clock generation apparatus 110.

The plurality of reception circuits 120 are connected with the clock generation apparatus 110 via the transmission line 130. Each of the plurality of reception circuits 120 has path differences to the clock generation apparatus 110. Each of the plurality of reception circuits 120 operates based on an active system clock signal received from the clock generation apparatus 110.

Here, in the clock generation apparatus 110 according to this exemplary embodiment, it is supposed that a clock transmission circuit to output an active system clock signal has been switched over. At that time, regarding an active system clock signal which is outputted by the clock generation apparatus 110 according to this exemplary embodiment, a difference does not occur to received clocks received by the reception circuits 120 that are clock supply destinations, even if a clock transmission circuit inside the clock generation apparatus 110 is switched over.

When a general clock transmission circuit is used, a difference may occur to received clocks due to a path difference to the clock transmission circuit between reception circuits to be clock supply destinations. For example, a short pulse may occur in addition to a usual clock when an active system clock and a stand-by system clock is switched at timing that they have approximately the same phase and, in addition, at timing of clock rise. As a result, in each reception circuit which is a clock supply destination, clocks increased unnecessarily by one pulse are received when a path length is short, and clocks without one-pulse increase are received when a path length is long because the pulse is dulled. Thus, when there is a difference in received clocks depending on reception circuits which are a plurality of clock supply destinations, synchronization between the reception circuits cannot be achieved correctly any more.

In contrast, in a server system according to this exemplary embodiment, a short pulse does not occur because, even when a clock transmission circuit to output an active system clock is switched, the phases of clock signals which are transmitted from different clock transmission circuits are the same. As a result, in a server system according to this exemplary embodiment, a difference due to path differences does not occur to clocks supplied to reception circuits.

Regarding a control method of a clock generation apparatus described in each exemplary embodiment of the present invention, even if it does not depend on the same structure as each exemplary embodiment, it is deemed to be included in the scope of the present invention if it is a method to which the above-mentioned techniques and methods are applied or a method guessed from the above-mentioned techniques and methods. A program which makes a computer execute a control method of a clock generation apparatus according to an exemplary embodiment of the present invention is also deemed to be included in the scope of the present invention. Further, a program storage medium storing a program included in the scope of the present invention is also deemed to be included in the scope of the present invention.

Although the present invention has been described with reference to an exemplary embodiment above, the present invention is not limited to the above-mentioned exemplary embodiments. Various changes which a person skilled in the art can understand can be performed in the composition and details of the present invention within the scope of the present invention.

DESCRIPTION OF SYMBOLS

1 Clock generation apparatus
2 Clock determination means
3 Clock switching means
10 and 20 Clock generation apparatus
11-1 First clock transmission circuit
11-2 Second clock transmission circuit
21-1 First clock transmission circuit
21-2 Second clock transmission circuit
13 Clock bus
21-1 First clock transmission circuit
21-2 Second clock transmission circuit
100 Server system
101 and 111 Clock generating means
102 and 112 Clock measurement means
103 and 113 Clock switching availability determination means
104 and 114 Clock switching directing means
105 and 115 Output clock switching means
106 and 116 Clock phase changing means
110 Clock generation apparatus
120 Reception circuit
130 Transmission line

The invention claimed is:

1. A clock generation apparatus, comprising: a clock determination unit which determines whether a cycle shift time between a first clock signal and a second clock signal satisfies a predetermined condition; and
a clock switching unit which switches said first clock signal and said second clock signal based on determination of said clock determination unit;
a clock bus to which an active system clock signal is outputted,
wherein said clock switching unit carries out switching so as to make one clock signal among said first clock signal and said second clock signal be said active system clock signal to be outputted to outside, and the other clock signal be a stand-by system clock signal to be restrained inside,
wherein said clock determination unit determines that a clock signal outputted to said clock bus can be switched when, as said predetermined condition, a first condition that said cycle shift time is equal to or more than a period from a setup start time to a hold end time of a signal specified for said clock bus and a second condition that said cycle shift time exists before a next setup start time are satisfied together.

2. The clock generation apparatus according to claim 1, wherein a plurality of clock transmission circuits each having said clock determination unit and said clock switching unit are connected with each other via said clock bus.

3. The clock generation apparatus according to claim 2, wherein said clock determination unit comprises:
a clock generating unit which generates a clock signal;
a clock measurement unit which measures a phase difference between said clock signal generated by its own clock transmission circuit and said active system clock signal; and
a clock switching availability determination unit determines, based on a phase difference between a clock signal having been generated by said own clock transmission circuit and measured by said clock measurement unit and said active system clock signal, that switching of a clock is possible when a cycle shift time between said clock signal generated by said own circuit and said active system clock signal satisfies said predetermined condition, wherein
said clock switching unit comprises:
a clock switching directing unit which issues, according to a clock switching request signal received from an upper system, an instruction to output a clock signal generated by said own clock transmission circuit based on determination by said clock switching availability determination unit; and
an output clock switching unit which carries out switching, according to said instruction of said clock switching directing unit, so as to make a clock signal generated by said own clock transmission circuit be outputted to said clock bus.

4. The clock generation apparatus according to claim 3, wherein said clock switching directing unit of said clock transmission circuit having received said clock switching request signal
issues, according to said clock switching request signal, to said output clock switching unit of said own clock transmission circuit an instruction to make said clock transmission circuit outputting said active system clock signal suspend outputting a clock signal to said clock bus, and wherein
said output clock switching unit having received said clock switching request signal transmits, according to said instruction of said clock switching directing unit, to said output clock switching unit of said clock transmission circuit outputting said active system clock signal a clock output suspension signal to suspend outputting a clock signal to said clock bus.

5. The clock generation apparatus according to claim 3, wherein said clock transmission circuit comprises a clock phase changing unit which changes, upon being determined by said clock switching availability determination unit that said predetermined condition is not satisfied, a phase of a clock signal generated by said own clock transmission circuit so as to make said predetermined condition be satisfied.

6. A server system, comprising: a clock generation apparatus having a clock determination unit which determines whether a cycle shift time of a first clock signal and a second clock signal satisfies a predetermined condition or not and a clock switching unit which switches said first clock signal and said second clock signal based on determination of said clock determination unit;

a plurality of reception circuits to operate based on a clock signal outputted by said clock generation apparatus, said plurality of reception circuits being connected with said clock generation apparatus via a transmission line; and a transmission line which connects said clock generation apparatus and said plurality of reception circuits, the transmission line to which an active system clock signal is outputted, wherein said clock switching unit carries out switching so as to make one clock signal among said first clock signal and said second clock signal be said active system clock signal to be outputted to outside, and the other clock signal be a stand-by system clock signal to be restrained inside, wherein said clock determination unit determines that a clock signal outputted to said clock bus can be switched when, as said predetermined condition, a first condition that said cycle shift time is equal to or more than a period from a setup start time to a hold end time of a signal specified for said clock bus and a second condition that said cycle shift time exits before a next setup start time are satisfied together.

7. A clock control method, comprising the steps of: determining whether a cycle shift time between a first clock signal and a second clock signal satisfies a predetermined condition or not; and switching said first clock signal and said second clock signal based on determination of whether said cycle shift time satisfies said predetermined condition, wherein determination that switching of a clock signal to be outputted to said clock bus is possible is made when, as said predetermined condition, a first condition that said cycle shift time is equal to or more than a period from a setup start time to a hold end time of a signal specified for said clock bus and a second condition that said cycle shift time exists before a next setup start time are satisfied together.

* * * * *